(12) United States Patent
Matei et al.

(10) Patent No.: US 10,788,012 B2
(45) Date of Patent: Sep. 29, 2020

(54) OCEAN POWERED RANKINE CYCLE TURBINE

(71) Applicant: AOE ACCUMULATED OCEAN ENERGY INC., Concord, NH (US)

(72) Inventors: Jim Matei, Sooke (CA); Jason Goldsworthy, Sidney (CA)

(73) Assignee: AOE ACCUMULATED OCEAN ENERGY INC., Sooke, BC (CA)

( * ) Notice: Subject to any disclaimer, the term of this patent is extended or adjusted under 35 U.S.C. 154(b) by 47 days.

(21) Appl. No.: 16/240,255

(22) Filed: Jan. 4, 2019

(65) Prior Publication Data
US 2020/0217293 A1 Jul. 9, 2020

(51) Int. Cl.
*F03B 13/22* (2006.01)
*F01K 25/04* (2006.01)

(52) U.S. Cl.
CPC .............. *F03B 13/22* (2013.01); *F01K 25/04* (2013.01)

(58) Field of Classification Search
CPC ...... F03B 13/26; F03B 13/16; F03B 13/1885; F03B 13/20; F03B 15/00; F05B 2240/93; F05B 2260/4031; F05B 2220/706; F05B 2240/97; F05B 2280/5001; Y02E 10/38
See application file for complete search history.

(56) References Cited

U.S. PATENT DOCUMENTS

| | | | |
|---|---|---|---|
| 4,055,145 A * | 10/1977 | Mager | F03G 7/05 119/212 |
| 7,781,903 B2 | 8/2010 | Buffard et al. | |
| 8,097,218 B1 | 1/2012 | Manaugh | |
| 8,664,785 B2 | 3/2014 | Madison | |
| 8,733,103 B2 | 5/2014 | Diaz | |
| 9,022,692 B2 | 5/2015 | Frazier et al. | |
| 9,032,732 B1 * | 5/2015 | Cowden | F03G 7/04 60/641.1 |

(Continued)

FOREIGN PATENT DOCUMENTS

| | | |
|---|---|---|
| CN | 101315056 A | 12/2008 |
| CN | 103047085 A | 4/2013 |

(Continued)

OTHER PUBLICATIONS

Makai diagram—Fig. 3 labelled as Prior Art, is a schematic diagram of an ocean powered Rankine cycle turbine that uses differential ocean temperatures.

*Primary Examiner* — Shafiq Mian
(74) *Attorney, Agent, or Firm* — Davis & Bujold PLLC; Michael J. Bujold

(57) ABSTRACT

An ocean powered Rankine cycle turbine includes a loop in which is circulated a working fluid. A first heat exchanger effects a phase change of the working fluid from liquid to gas. The gas expands to power a turbine. Gas exiting the turbine is condensed by a second heat exchanger to effect a phase change from gas back to liquid. A piston assembly is used to compress air. A wave energy converter uses ocean wave energy to reciprocally move the piston. As the wave goes down, the piston is extends drawing air into the piston housing. As the wave goes up, the piston compresses the air. Heat generated as the piston compresses air, is used to as a heat source for the first heat exchanger. Cold compressed air is used as a cold source for the second heat exchanger.

7 Claims, 5 Drawing Sheets

(56) References Cited

U.S. PATENT DOCUMENTS

| | | | | |
|---|---|---|---|---|
| 2009/0178722 A1* | 7/2009 | Howard | ............... | B63B 35/44 |
| | | | | 138/106 |
| 2010/0275597 A1* | 11/2010 | Kuo | ............... | F16L 1/15 |
| | | | | 60/641.7 |
| 2012/0012276 A1 | 1/2012 | Von Herzen et al. | | |
| 2015/0052894 A1* | 2/2015 | Teixeira | ............... | F01K 7/22 |
| | | | | 60/641.7 |
| 2015/0075657 A1 | 3/2015 | Edwards | | |
| 2015/0292490 A1* | 10/2015 | Cole | ............... | F03G 7/05 |
| | | | | 138/107 |

FOREIGN PATENT DOCUMENTS

| | | |
|---|---|---|
| CN | 202971047 U | 6/2013 |
| CN | 104261498 A | 1/2015 |
| CN | 204646526 U | 9/2015 |
| EP | 1734255 A1 | 12/2006 |
| EP | 2108831 A1 | 10/2009 |
| JP | 10205891 | 8/1998 |
| WO | 2013086092 A1 | 6/2013 |

\* cited by examiner

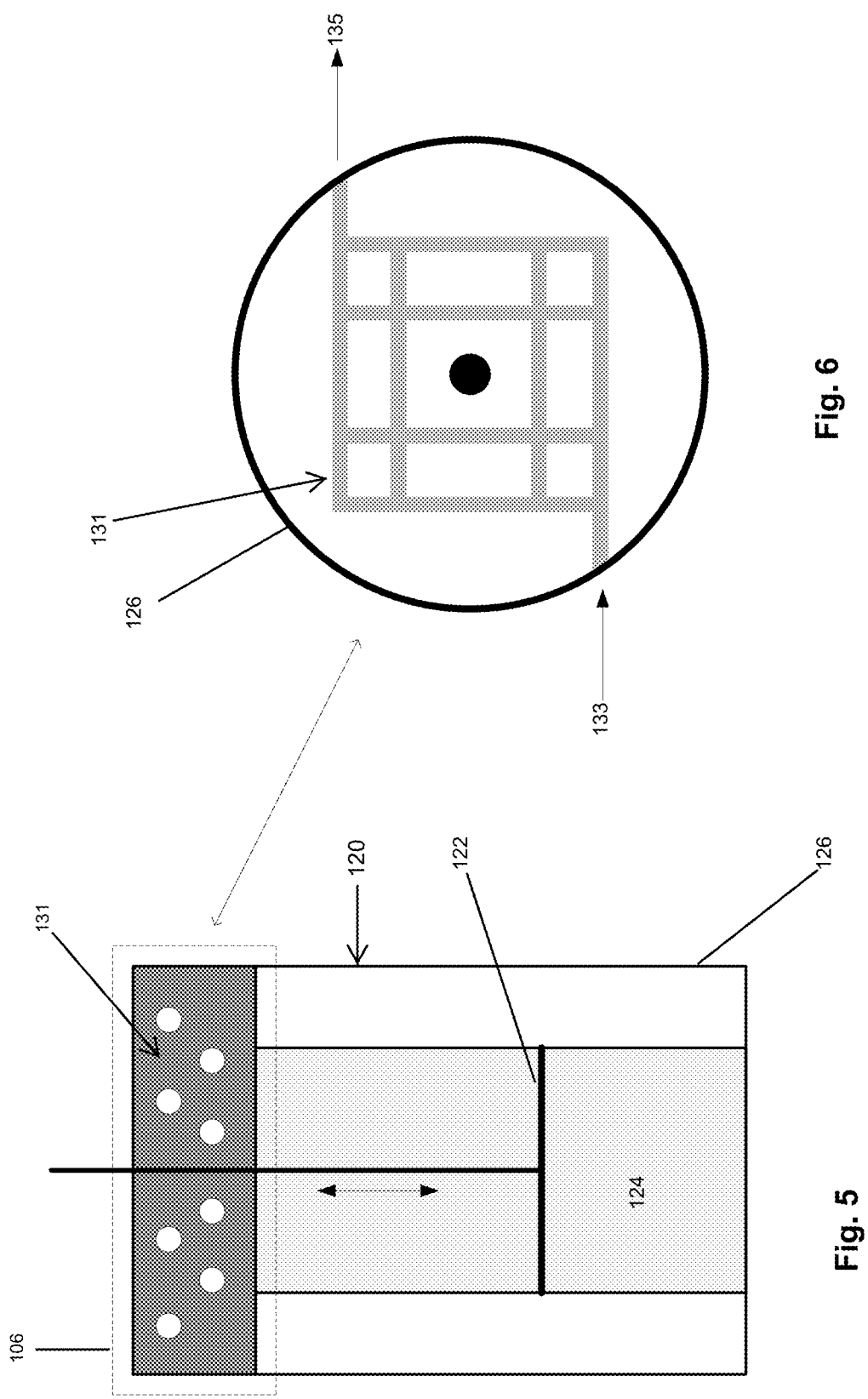

OCEAN POWERED RANKINE CYCLE TURBINE

FIELD

There is described turbine that uses the ocean to create a Rankine cycle to turn a turbine.

BACKGROUND

Makai Ocean Engineering Inc (Makai) has developed Ocean Thermal Energy Conversion (OTEC) technology to generate electricity using the thermal properties of the ocean water off Hawaii.

Referring to FIG. 3, labelled as PRIOR ART, and generally identified by reference numeral 10, the Ocean Thermal Energy Conversion (OTEC) technology developed by Makai. An ocean heat source is provided by pump 12 which pumps warm ocean water draw from a shallow water intake 14 through a warm water supply line 16 through a heat exchanger 18 where the warm ocean water is used to heat a working fluid to effect a phase change from liquid to gas. The working fluid exiting first heat exchanger 18, passes along a gaseous phase working fluid supply line 20 which supplies working fluid in the form of a gas to power a turbine 22. Working fluid exits turbine 22 and passes along working fluid recycle line 32 to a heat exchanger 30.

An ocean cold source is provided by a pump 24 which pumps cold ocean water drawn from a deep water intake 26 through a cold water supply line 28 to the heat exchanger 30 where the cold ocean water is used to cool the working fluid from turbine 22, until the working fluid undergoes a phase change from gas back to liquid. The working fluid exiting heat exchanger 30 in the form of a liquid passes along liquid phase working fluid supply line 34 and is pumped by a pump 36 back through first heat exchanger 18 to complete a loop. The warm ocean water passing through first heat exchanger 18 and the cold ocean water passing through second heat exchanger 30 are directed to an ocean water return line 38, where the two streams are mixed prior to be discharged into the ocean through mixed temperature water outlet 40.

The conversion of thermal energy into usable mechanical power is in accordance with Carnot heat engine theory in which an amount of heat Qh flows from a high temperature reservoir Th through a working body that does mechanical work, W and results in a remaining heat flow Qc to a cold sink with temperature Tc.

A standard Rankine cycle represents an application of the Carnot engine theory, where a phase change working fluid, such as water, is used to transfer the heat energy to do mechanical work. When the phase change working fluid is water, the water is boiled to steam, the steam drives a turbine and then condenses back to water for pumping through the system.

The four processes associated with a Rankine cycle are as follows:

Working fluid is pumped from low to high pressure as a liquid. The energy required to raise the pressure of the working fluid by the pump is represented by Wpump.

High pressure working fluid (as a liquid) enters a boiler where it is heated by an external heating source to dry saturated vapour. The input energy required to heat the working fluid to this state is quantified as Qin.

The working fluid as a dry saturated vapour expands through a turbine. As the working fluid drives the turbine to do work W, the working fluid cools (lowers temperature) and lowers pressure.

The working fluid enters a condenser as a wet vapour to become a saturated liquid. Any exhaust heat that is not contained within the Rankine closed loop cycle is represented by Qout.

The efficiency of the cycle is measured in two ways:

$$\text{Actual efficiency} - \eta = \frac{W}{Qin}$$

$$\text{Carnot cycle efficiency} - \eta = \frac{Th - Tc}{Th}$$

The difference between the two efficiency measures is that the Carnot cycle efficiency assumes that no entropy is added to the system by the pump or the turbine (i.e. the pump and the turbine are isentropic). In other words, the Carnot cycle efficiency is a good measure of the efficiency of the Carnot heat engine cycle, or the heating and cooling elements of the Rankine cycle. The actual efficiency considers the impact of the pump and the turbine on the efficiency of the system. The type of working fluid is not critical.

SUMMARY

There is provided an ocean powered Rankine cycle turbine which includes a primary Rankine cycle loop in which is circulated a working fluid which changes phase from a liquid to a gas when heated. A liquid phase working fluid supply line feeds working fluid in liquid form to a first heat exchanger which effects a phase change from liquid to gas. The first heat exchanger is connected by a gaseous phase working fluid supply line which supplies working fluid in gas form to a turbine. A working fluid recycle line feeds working fluid in gas form to a second heat exchanger to effect a phase change from gas to liquid. The second heat exchanger is connected to the liquid phase working fluid supply line which supplies working fluid in the form of liquid to the first heat exchanger. A first pump is positioned on the liquid phase working fluid supply line to pump the working fluid in the form of liquid. One or more piston assemblies are provided for compressing air. Each piston assembly includes a piston that is reciprocally movable within an interior of a piston housing between an extended position extending farther out of the piston housing and a retracted position retracted farther into the piston housing. Ocean powered input is provided in the form of a wave energy converter that uses ocean wave energy to reciprocally move each piston between the extended position and the retracted position. As each wave goes down, each piston is moved to the extended position drawing air into the interior of the piston housing. As each wave goes up, the piston is moved to the retracted position compressing air within the interior of the piston housing. A heat source is provided in the form of a hollow structure forming part of the piston housing that defines the first heat exchanger of the closed working fluid loop. Heat generated within the interior of the piston housing, as the piston compresses air, is used to effect a phase change of the working fluid from a liquid to a gas. A cold source is provided in the form of cold compressed air expelled from the interior of the piston housing. The cold compressed air is directed through the second heat exchanger to effect a phase change of the working fluid from gas to liquid.

In the manner described above, the piston assemblies provide both a heat source and a cold source, powered by the endless energy supplied by the wave action of the ocean. It has been found that there is a surplus supply of compressed air. This surplus supply of compressed air can be used for other purposes. For example, the surplus supply of compressed air can be used to power one or more air driven motor. The energy from the one or more air driven motors can be used within the primary Rankine cycle loop to drive the pump. The energy from the one or more air driven motors can be used for other purposes outside of the Rankine cycle loop. The surplus supply of compressed air can also be used pressurize sequential piston assemblies, as will hereafter be further described.

The ocean powered Rankine cycle turbine that uses wave action, as described, above, can also be used to increase the actual efficiency of an ocean powered Rankine cycle turbine that uses differential ocean temperatures, as disclosed by Makai Ocean Engineering.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 5 is a side elevation view, in section, of a heat exchanger built into a piston housing.

FIG. 6 is a top plan view, in section, of the heat exchanger built into the piston housing of FIG. 5.

DETAILED DESCRIPTION

Figure 1:
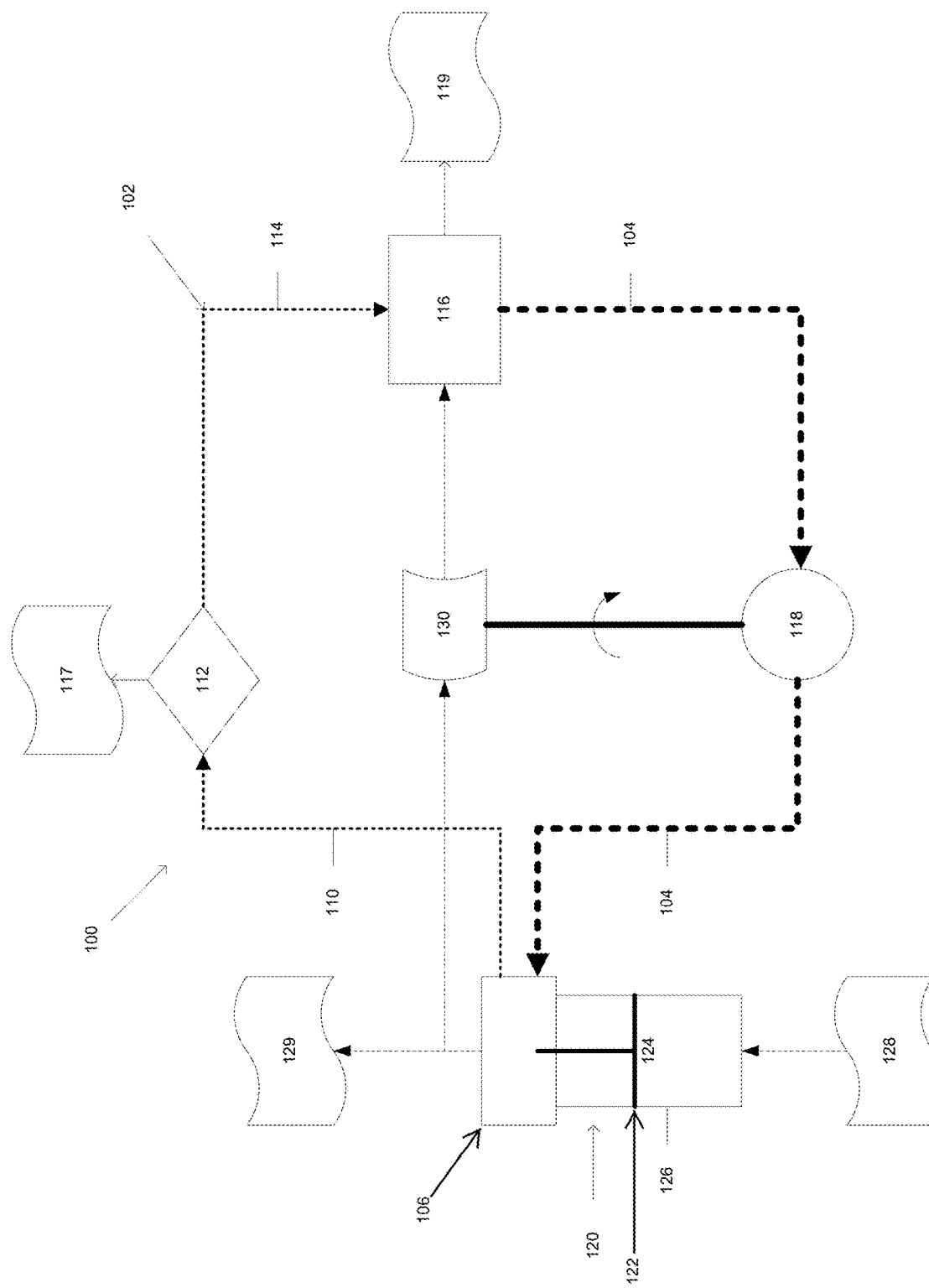
FIG. 1 is a schematic diagram of an ocean powered Rankine cycle turbine that uses wave energy.

An ocean powered Rankine cycle turbine generally identified by reference numeral 100, will now be described with reference to FIGS. 1 and 2.

STRUCTURE AND RELATIONSHIP OF PARTS

Referring to FIG. 1, ocean powered Rankine cycle turbine 100, includes a primary Rankine cycle loop 102 in which is circulated a working fluid which changes phase from a liquid to a gas when heated. A liquid phase working fluid supply line 104 feeds working fluid in liquid form to a first heat exchanger 106 to effect a phase change from liquid to gas. First heat exchanger 106 is connected by a gaseous phase working fluid supply line 110 which supplies working fluid in gas form to a turbine 112 which has a work output 117. A working fluid recycle line 114 feeds working fluid in gas form to a second heat exchanger 116 to effect a phase change from gas to liquid. The second heat exchanger being 116 is connected by the liquid phase working fluid supply line 104 which supplies working fluid in the form of liquid to first heat exchanger 106. A first pump 118 is positioned on liquid phase working fluid supply line 104 to pump the working fluid in the form of liquid.

A piston assembly 120 is provided for compressing air. Piston assembly 120 has a piston 122 that is reciprocally movable within an interior 124 of a piston housing 126 between an extended position extending farther out of piston housing 126 and a retracted position retracted farther into piston housing 126. An ocean powered input, in the form of a wave energy converter 128, uses ocean wave energy to reciprocally move piston 122 between the extended position and the retracted position, such that as each wave goes down the piston 122 is moved to the extended position drawing air into interior 124 of piston housing 126 and as each wave goes up and piston 122 is moved to the retracted position compressing air within interior 124 of piston housing 126.

A heat source for the Rankine Cycle is provided in the form of a hollow structure within piston housing 126 that defines first heat exchanger 106 of the closed working fluid loop. Heat generated within interior 124 of piston housing 126 as piston 122 compresses air is used to effect a phase change of the working fluid from a liquid to a gas.

A cold source for the Rankine Cycle is provided in the form of cold compressed air expelled from interior 124 of piston housing 126. This cold compressed air is directed through the second heat exchanger 116 to effect a phase change of the working fluid from gas to liquid.

It is preferred that some of the compressed air generated be used to power an air driven motor 130 prior to being circulated through second heat exchanger 116. Air driven motor 130 can be used for various purposes, such as driving first pump 118. Compressed air exiting second heat exchanger 116 is vented to atmosphere 119.

Figure 2:
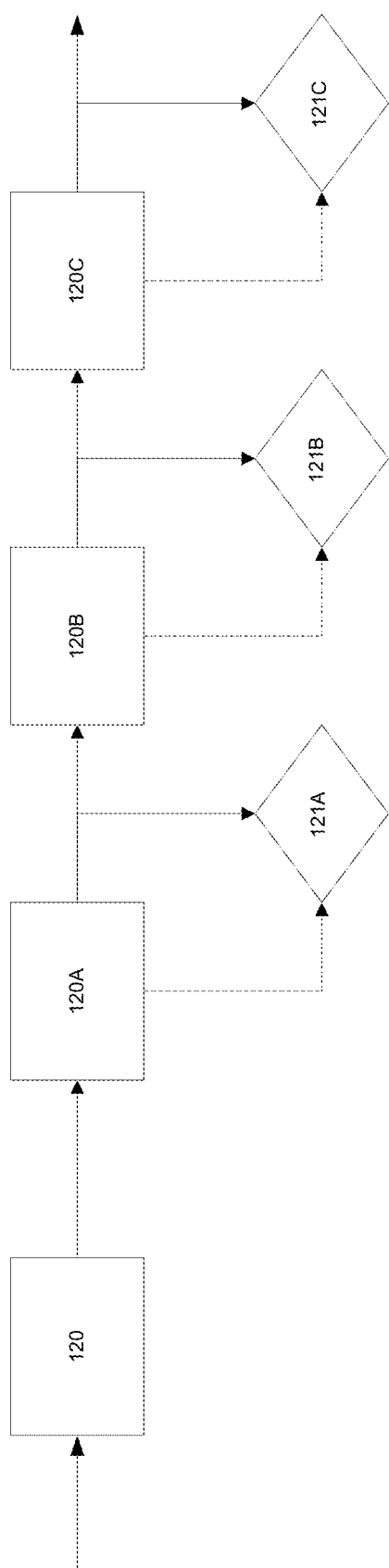
FIG. 2 is a diagram of a wave energy converter with sequential piston assemblies.

Referring to FIG. 2, a portion of the compressed air 129 exiting piston assembly 120 can be used to pressurize sequential piston assemblies in a series of stages. Piston assembly 120 draws air in through an atmospheric air intake. However, there is excess compressed air 129 that can be used to supply subsequent stages with air that has already been compressed and, consequently, the compression cycle for the subsequent stage starts at a higher pressure. This has been illustrated by a stage 2 identified as piston assembly 120A, stage 3 identified as piston assembly 120B and stage 4 identified as piston assembly 120C. It should be noted that with each sequential stage the pressure of the incoming compressed air has been increased by the prior stage. As a consequence the operating pressures of piston assembly 120A are higher than those in piston assembly 120; the operating pressures of piston assembly 120B are higher than those in piston assembly 120A; and the operating pressures of piston assembly 120C are higher than those in piston assembly 120B. This sequential pressurization allows pressures to be achieved that would not be possible with a single piston assembly 120. It is to be noted that at each stage heat is generated during compression and that heat energy is captured and stored, in storage units 121A, 121B, 121C respectively, for either heat exchange or other useful purposes.

Referring to FIG. 5 and FIG. 6, further information is provided regarding the structure of heat exchanger 106 associated with piston assembly 120. In order to capture heat from piston assembly 120, piston housing 126 is dual walled, with a heat capture space 127 positioned between the dual walls. In order to effect a heat exchange a network of pipes 131 traverses heat capture space 127. Network of pipes 131 has an inlet 133 which connects to liquid phase working fluid supply line 104 and an outlet 135 which connects to gaseous phase working fluid supply line 110.

OPERATION

Referring to FIG. 1, wave energy converter 128, uses ocean wave energy to reciprocally move piston 122 between the extended position and the retracted position. As the wave goes down, piston 122 is moved to the extended position drawing air into interior 124 of piston housing 126. As the wave goes up, piston 122 is moved to the retracted position compressing air within interior 124 of piston housing 126. Heat is generated within interior 124 of piston housing 126 as piston 122 compresses air. This heat is captured and transferred to the working fluid by first heat exchanger 106, causing a phase change in the working fluid from liquid to gas. First heat exchanger 106 then supplies working fluid in gas form to a turbine 112 through gaseous phase working fluid supply line 110. The expansion of the working fluid in gas form, causes turbine 112 to rotate producing work output 117. Working fluid in the form of gas exiting turbine 112 passes to second heat exchanger 116 through working fluid recycle line 114.

The stream of cold compressed air exiting piston assembly 120 is very cold. This cold is captured and transferred to the working fluid by second heat exchanger 116, causing a phase change of the working fluid from gas back to liquid. The compressed air generated is used to power air driven motor 130 prior to being circulated through second heat exchanger 116. Air driven motor 130 is used to drive first pump 118. First pump 118 pumps working fluid in the form of liquid back through first heat exchanger 106 via liquid phase working fluid supply line 104. After passing through second heat exchanger 116, the compressed air is vented to atmosphere 119.

VARIATIONS

Figure 3:
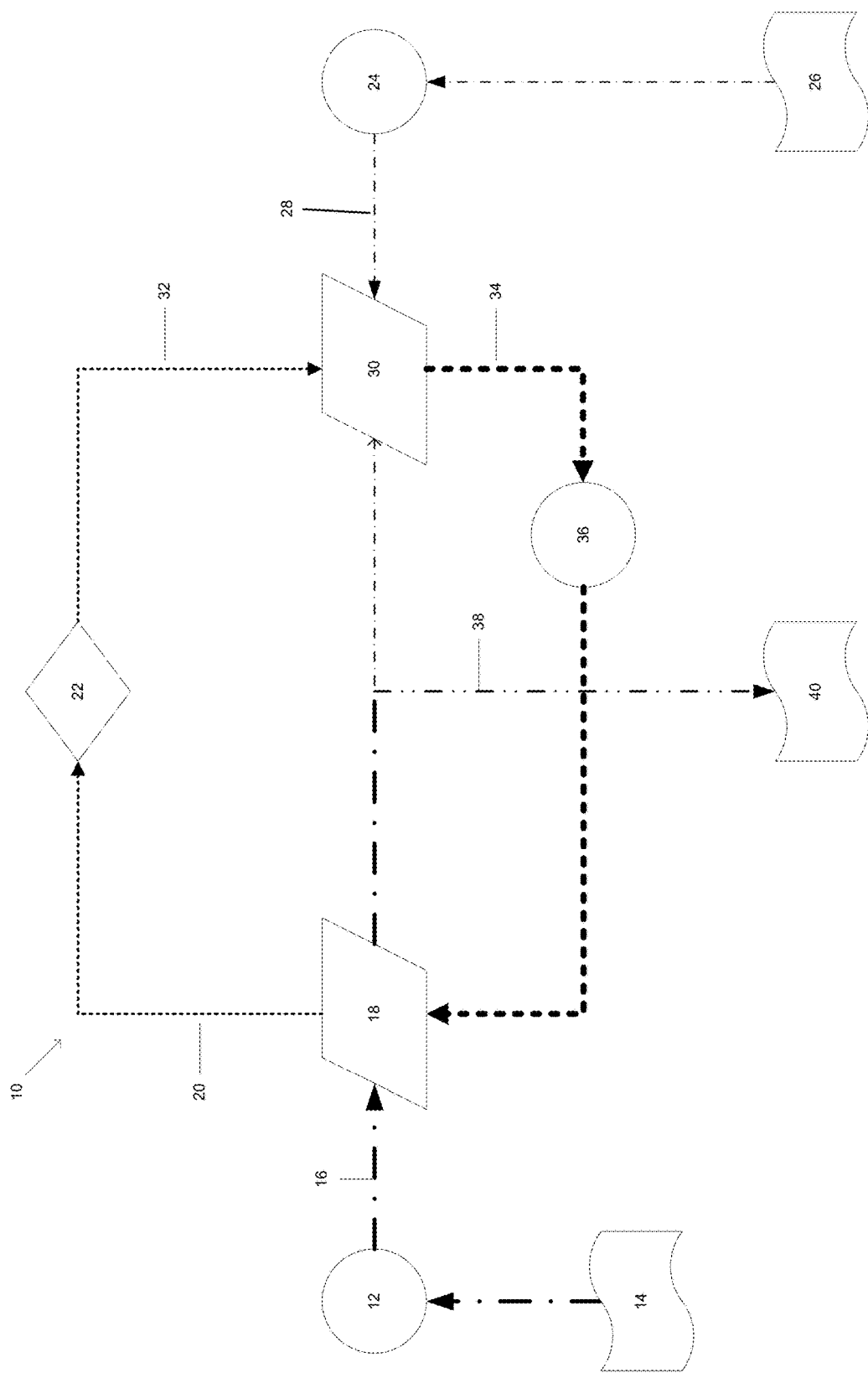
FIG. 3 labelled as PRIOR ART, is a schematic diagram of an ocean powered Rankine cycle turbine that uses differential ocean temperatures.
Figure 4:
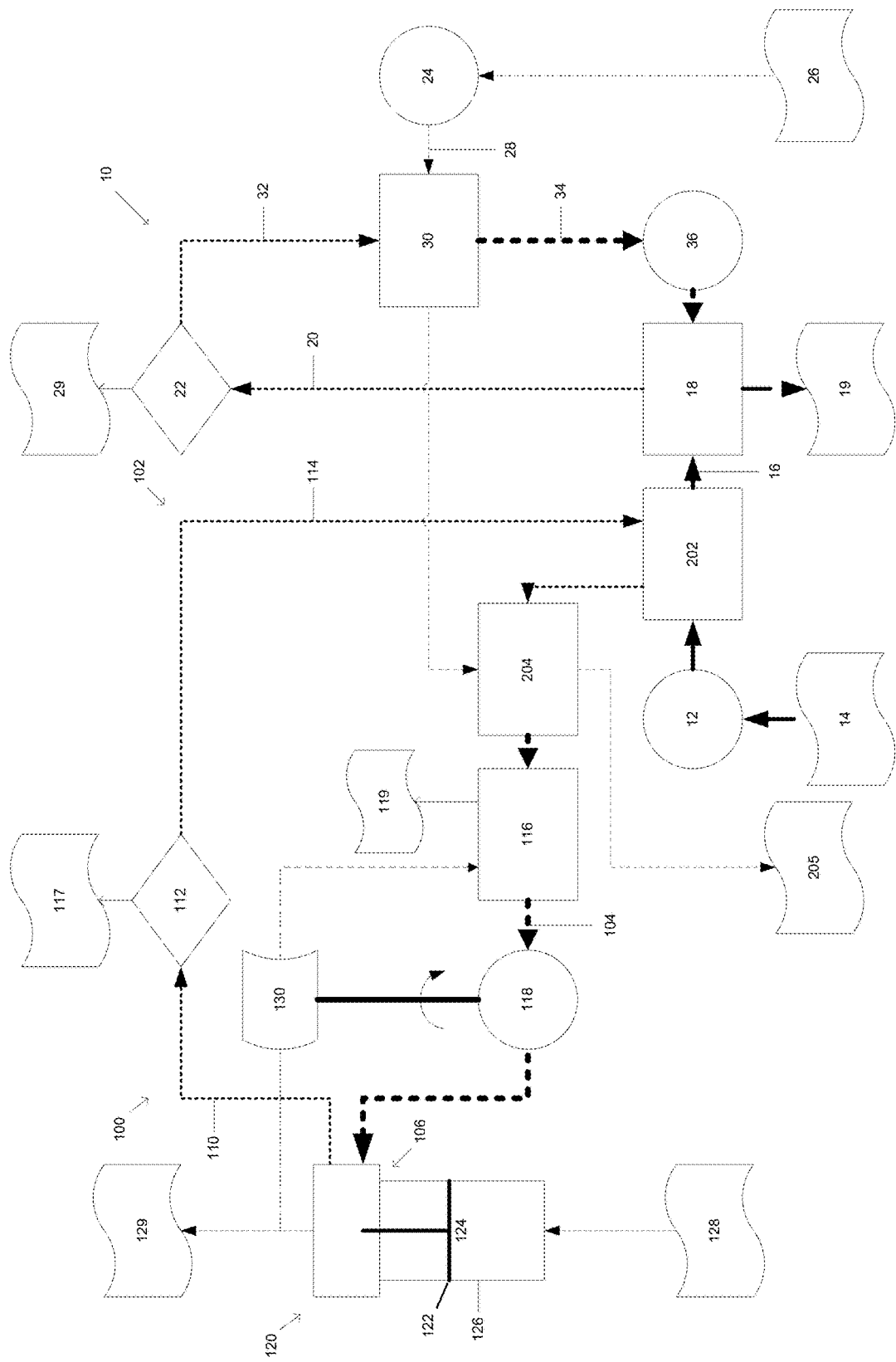
FIG. 4 is a diagram of an ocean powered Rankine cycle turbine that uses a combination of wave energy and differential ocean temperatures.

A variation of ocean powered Rankine cycle turbine 100, will now be described with reference to FIG. 4. All of the elements of ocean powered Rankine cycle turbine 100, described above with reference to FIG. 1 are present and will be identified by the reference numerals with which they were identified in FIG. 1. However, this variation incorporates and intermeshes with Ocean Thermal Energy Conversion (OTEC) technology. So that the reader can understand how the elements of the OTEC technology were incorporated, the same reference numerals will be used as were used with FIG. 3. Totally new elements that are introduced to integrate the two technologies will be identified by 200 series reference numerals.

The OTEC technology is used as a secondary Rankine cycle loop 10 in which is circulated a working fluid which changes phase from a liquid to a gas when heated. A liquid phase working fluid supply line 34 feeds working fluid in liquid form to a (third) heat exchanger 18 to effect a phase change from liquid to gas. Gaseous phase working fluid exiting (third) heat exchanger 18 is directed to a gaseous phase working fluid supply line 20 which supplies working fluid in gaseous form to a (second) turbine 22 which produces work output 29. A working fluid recycle line 32 feeds working fluid in gas form to a (fourth) heat exchanger 30 to effect a phase change from gas to liquid. (Fourth) heat exchanger 30 is connected by a liquid phase working fluid supply line 34 which supplies working fluid in the form of liquid to the (third) heat exchanger 18. A (second) pump 36 being positioned on liquid phase working fluid supply line 34 to pump the working fluid in the form of liquid.

A heat scavenging heat exchanger 202 is placed on working fluid recycle line 114 feeding working fluid in gas form to second heat exchanger 116 of primary Rankine cycle loop 102. A cold scavenging heat exchanger 204 is placed on working fluid recycle line 114 feeding working fluid in gas form to second heat exchanger 116 of primary Rankine cycle loop 102.

An ocean heat source is provided by a (third) 12 pump which pumps warm ocean water draw from a shallow water intake 14 through a warm water supply line 16 through heat scavenging heat exchanger 202 of primary Rankine cycle loop 102 where the working fluid of primary Rankine cycle loop 102 is used to increase the temperature of the warm ocean water prior to passing into (third) heat exchanger 18 that is used to heat the working fluid for secondary Rankine cycle loop 10. The warm ocean water exiting the (third) heat exchanger 18 is discharged back into the ocean through outlet 19.

An ocean cold source is provided by a (fourth) pump 24 which pumps cold ocean water drawn from a deep water intake 26 through a cold water supply line 28 to the (fourth) heat exchanger 30 that is used to cool the working fluid and then through cold scavenging heat exchanger 204 where the cold ocean water exiting the (fourth) heat exchanger 30 of the second Rankine cycle loop 10 is used to lower the temperature of the working fluid of the primary Rankine cycle loop 102 prior to passing into second heat exchanger 116 that is used to cool the working fluid for primary Rankine cycle loop 102, with the cold ocean water exiting cold scavenging heat exchanger 204 being discharged back into the ocean at outlet 205.

The Makai OTEC system uses ammonia as the working fluid and uses input warm water from the ocean surface at about 25 degree C. (298 K). The cold water intake from deeper locations of the ocean are about 5 degrees C. (278 K). This represents a Carnot cycle efficiency of approximately 6.7%. In a regular OTEC system, approximately 20% of the energy is required for the pumps and 80% is available for the turbine. Hence, the actual efficiency of a OTEC system akin to the Makai is approximately 5.4%.

ADVANTAGES

The key benefits of Primary Rankine Cycle Loop 102 are that more than 50% of the energy captured is captured as heat. Without a suitable manner to use this heat energy, it will be lost since the mechanical systems are unable to deal with the heat themselves. As such, Primary Rankine Cycle Loop 102 identifies a manner in which this energy may be captured and used to power a load. This in turn potentially improves the efficiency of ocean capture wave devices of up to 50%.

There are even greater benefits achieved through integration with an OTEC system:

1. There is an increase Carnot engine efficiency—by increasing the temperature of the intake water, the Carnot engine efficiency of the OTEC system will be increased.

2. There is an increase in actual efficiency. The actual efficiency of the system will be improved by a larger margin than the Carnot engine efficiency as the incorporation of the Primary Rankine Cycle Loop 102 will remove the need for pumping power to be added. This results in less power needed to run the system while still providing the same output. Any increase in the actual efficiency will improve the commercial viability of the OTEC system.

3. There is a reduction of capital costs by removing or reducing the need to source cooler water from ocean depths with large, long intake pipelines—since the expansion of the compressed air used to drive the working fluid pumps will aid the cooling of the working fluid, it will reduce the need to source cooler water from ocean depths. This need represents a large portion of the OTEC system capital cost, and any reduction in this cost will result in better system economics overall. The cost of a large diameter intake pipeline sourcing water from 3,300 feet (as described above) is likely be several factors more expensive than adding a Primary Rankine Cycle Loop 102.

4. It will minimize environmental impacts associated with discharge of heated water—as the working fluid of one system can be used to cool the working fluid of the other system so the water will be closer to the ambient temperature of the ocean. Hence, the environmental impacts associated with the discharge of the water will be reduced.

5. There will be an increase in the number of locations where deployment of an OTEC system are viable—since the OTEC system requires an appropriate difference in ocean temperature, it is usually only tropical areas where this technology is technically and commercially feasible. However, as the addition of the Primary Rankine Cycle Loop aids the heating and cooling of the intake water and working fluid respectively, the modified OTEC system is more likely to be feasible in less tropical areas. This expands the market potential for the modified OTEC system.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. An ocean powered Rankine cycle turbine apparatus, comprising:
    a primary Rankine cycle loop in which is circulated a first working fluid which changes phase from a liquid to a gas when heated, a liquid phase working fluid supply line feeding the first working fluid in liquid form to a first heat exchanger to effect a phase change from liquid to gas, the first heat exchanger being connected by a gaseous phase working fluid supply line which supplies the first working fluid in gas form to a turbine, a working fluid recycle line feeding the first working fluid in gas form to a second heat exchanger to effect a phase change from gas to liquid, the second heat exchanger being connected by the liquid phase working fluid supply line which supplies the first working fluid in the form of liquid to the first heat exchanger, a first pump being positioned on the liquid phase working fluid supply line to pump the first working fluid in the form of liquid;
    one or more piston assemblies for compressing air, each piston assembly comprising a piston that is reciprocally movable within an interior of a piston housing between an extended position extending farther out of the piston housing and a retracted position retracted farther into the piston housing;
    an ocean powered input in the form of a wave energy converter that uses ocean wave energy to reciprocally move each piston between the extended position and the retracted position, such that as each wave goes down each of the pistons is moved to the extended position drawing air into the interior of the piston housing and as each wave goes up and the piston is moved to the retracted position compressing air within the interior of the piston housing;
    a heat source comprising a hollow structure forming part of the piston housing that defines the first heat exchanger of the closed working fluid loop, heat generated within the interior of the piston housing as the piston compresses air being used to effect a phase change of the first working fluid from a liquid to a gas; and
    a cold source comprising cold compressed air expelled from the interior of the piston housing being directed through the second heat exchanger to effect a phase change of the first working fluid from gas to liquid.

2. The ocean powered Rankine cycle turbine apparatus of claim 1, wherein the compressed air exiting the second heat exchanger is vented to atmosphere.

3. The ocean powered Rankine cycle turbine apparatus of claim 1, wherein a portion of the compressed air exiting the one or more piston assemblies is used to power an air driven motor.

4. The ocean powered Rankine cycle turbine apparatus of claim 1, wherein the air driven motor drives the first pump.

5. The ocean powered Rankine cycle turbine apparatus of claim 1, wherein a portion of the compressed air exiting the one or more piston assemblies is used to pressurize sequential piston assemblies.

6. The ocean powered Rankine cycle turbine apparatus of claim 1, wherein
    a heat scavenging heat exchanger is placed on the working fluid recycle line feeding the first working fluid in gas form to the second heat exchanger of the primary Rankine cycle loop;
    a secondary Rankine cycle loop in which is circulated a second working fluid which changes phase from a liquid to a gas when heated, a liquid phase working fluid supply line feeding the second working fluid in liquid form to a third heat exchanger to effect a phase change from liquid to gas, the third heat exchanger being connected by a gaseous phase working fluid supply line which supplies second working fluid in gas form to a turbine, a working fluid recycle line feeding the second working fluid in gas form to a fourth heat exchanger to effect a phase change from gas to liquid, the fourth heat exchanger being connected by a liquid phase working fluid supply line which supplies the second working fluid in the form of liquid to the third heat exchanger, a second pump being positioned on the liquid phase working fluid supply line to pump the second working fluid in the form of liquid;
    an ocean heat source comprising a third pump to pump warm ocean water draw from a shallow water intake through a warm water supply line through the heat scavenging heat exchanger of the primary Rankine cycle loop where the second working fluid of the primary Rankine cycle loop is used to increase the temperature of the warm ocean water prior to passing into the third heat exchanger that is used to heat the second working fluid for the secondary Rankine cycle loop, with the warm ocean water exiting the third heat exchanger being discharged back into the ocean;
    an ocean cold source comprising a fourth pump to pump cold ocean water drawn from a deep water intake through a cold water supply line to the fourth heat exchanger that is used to cool the second working fluid, with the cold ocean water exiting the second heat exchanger being discharged back into the ocean.

7. The ocean powered Rankine cycle turbine apparatus of claim 1, wherein a cold scavenging heat exchanger is placed on the working fluid recycle line feeding the first working fluid in gas form to the second heat exchanger of the primary Rankine cycle loop;

a secondary Rankine cycle loop in which is circulated a second working fluid which changes phase from a liquid to a gas when heated, a liquid phase working fluid supply line feeding the second working fluid in liquid form to a third heat exchanger to effect a phase change from liquid to gas, the third heat exchanger being connected by a gaseous phase working fluid supply line which supplies the second working fluid in gas form to a turbine, a working fluid recycle line feeding the second working fluid in gas form to a fourth heat exchanger to effect a phase change from gas to liquid, the fourth heat exchanger being connected by a liquid phase working fluid supply line which supplies the second working fluid in the form of liquid to the third heat exchanger, a second pump being positioned on the liquid phase working fluid supply line to pump the second working fluid in the form of liquid;

an ocean heat source comprising a third pump to pump warm ocean water draw from a shallow water intake through a warm water supply line to the third heat exchanger, with the warm ocean water exiting the third heat exchanger being discharged back into the ocean;

an ocean cold source comprising a fourth pump to pump cold ocean water drawn from a deep water intake through a cold water supply line to the fourth heat exchanger that is used to cool the second working fluid and then through the cold scavenging heat exchanger where the cold ocean water exiting the fourth heat exchanger of the secondary Rankine cycle loop is used to lower the temperature of the second working fluid of the primary Rankine cycle loop prior to passing into the second heat exchanger that is used to cool the second working fluid for the primary Rankine cycle loop, with the cold ocean water exiting the cold scavenging heat exchanger being discharged back into the ocean.

* * * * *